Oct. 18, 1938.  S. W. SPARKS  2,133,874
METHOD AND APPARATUS FOR EXTRUDING METAL STRIPS
Filed Aug. 6, 1936  8 Sheets-Sheet 1
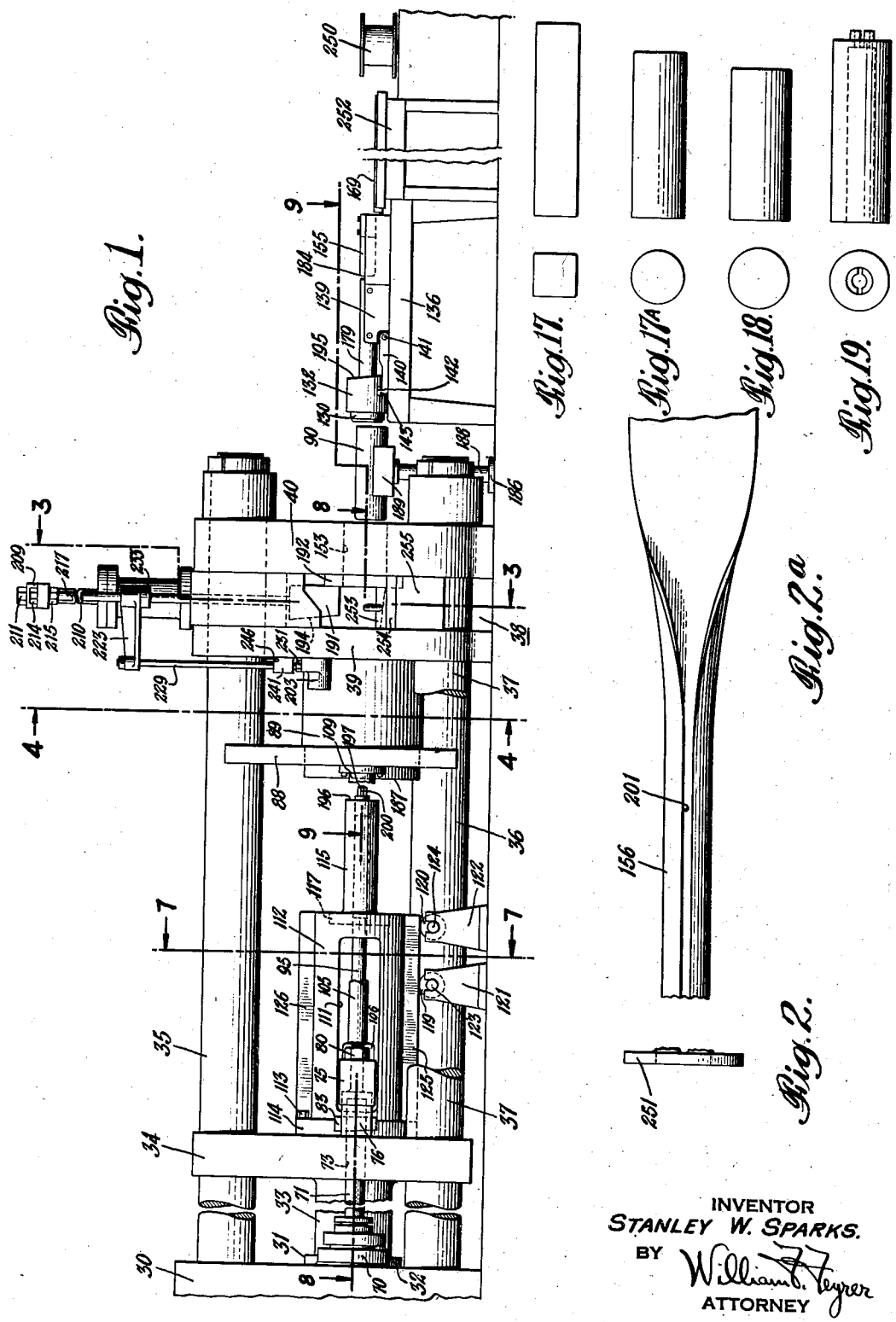
INVENTOR
STANLEY W. SPARKS.
BY William T. Teyrer
ATTORNEY

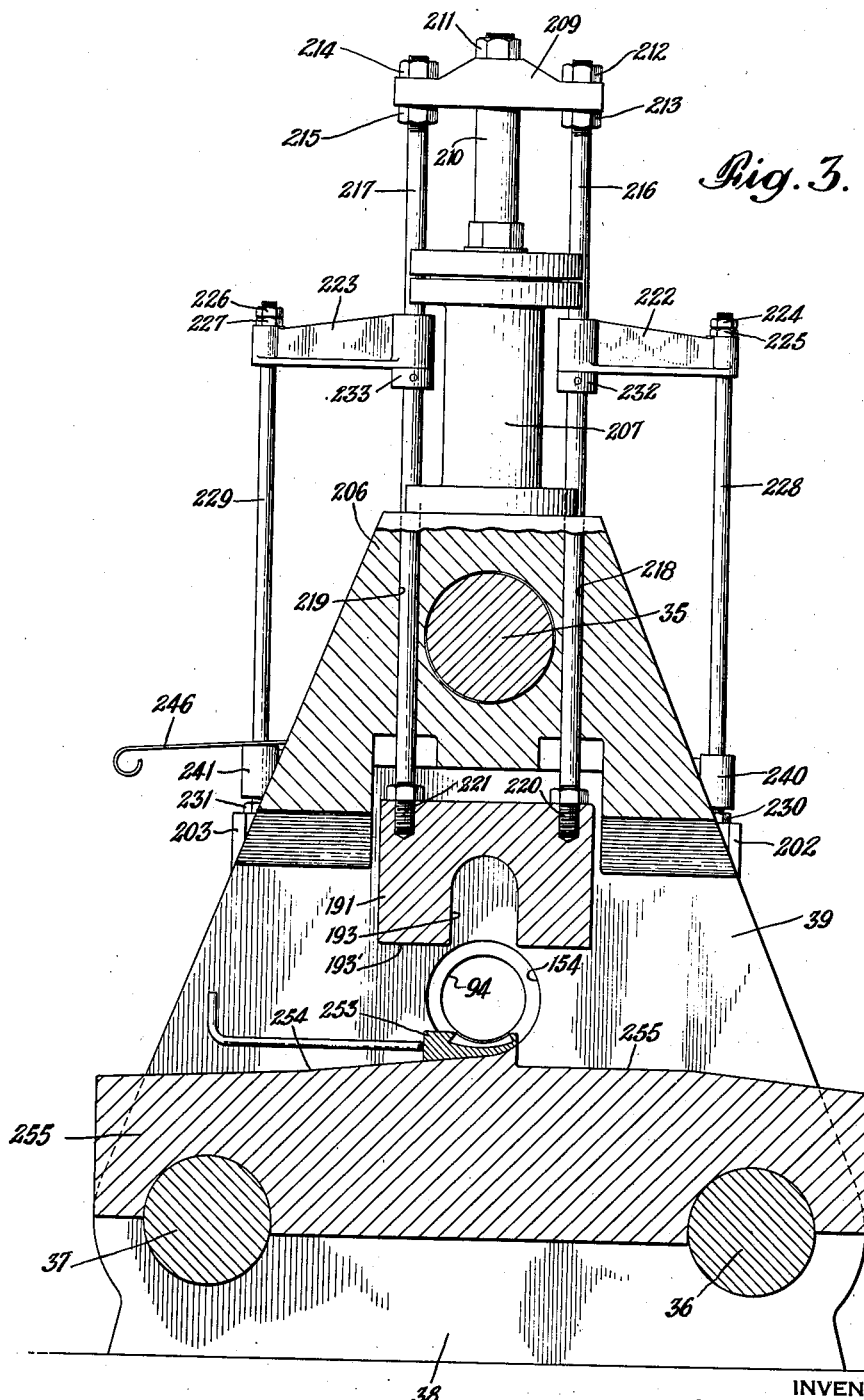

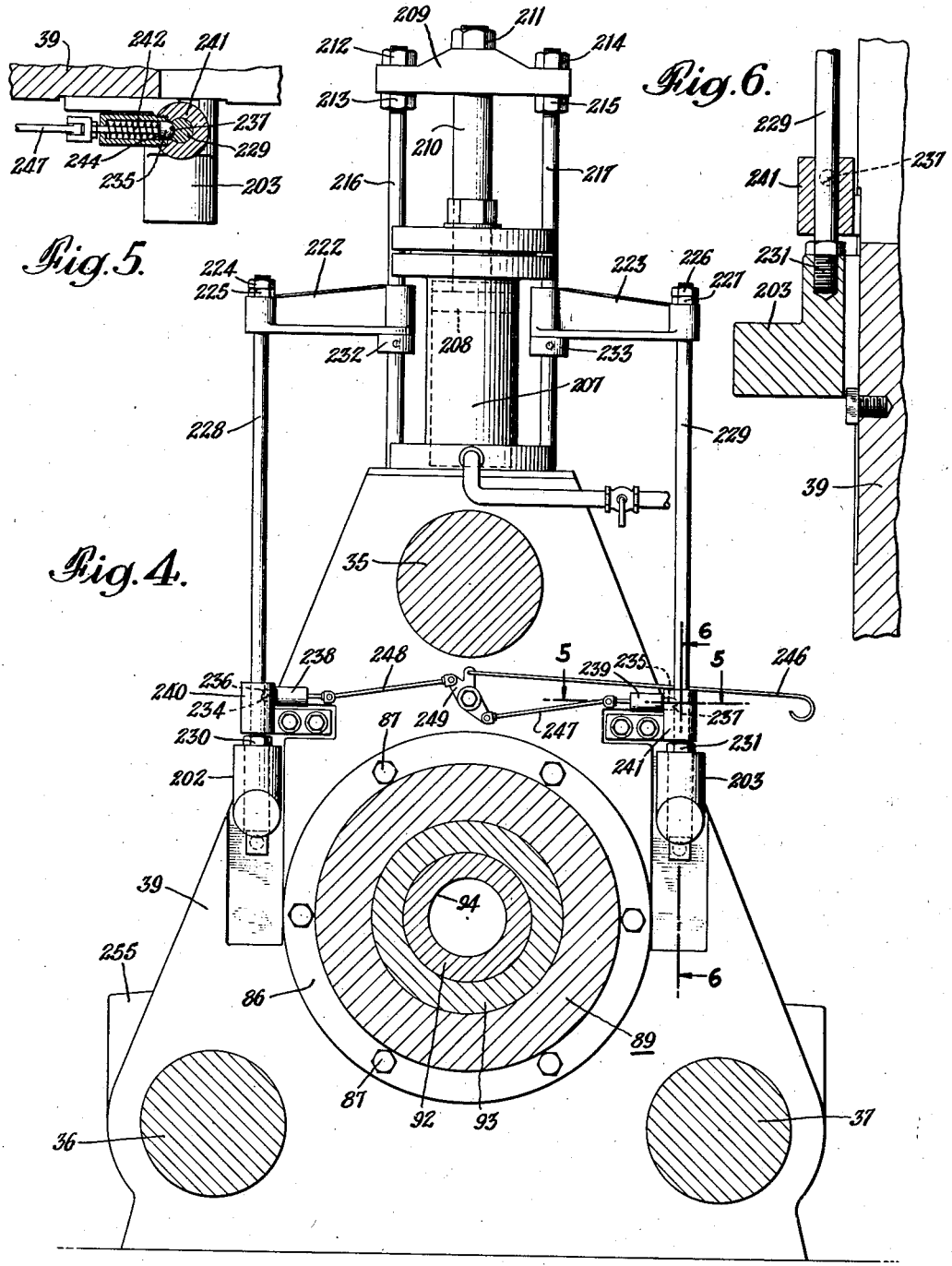

Oct. 18, 1938.   S. W. SPARKS   2,133,874
METHOD AND APPARATUS FOR EXTRUDING METAL STRIPS
Filed Aug. 6, 1936   8 Sheets-Sheet 4

INVENTOR
STANLEY W. SPARKS.
BY William H. Heyrer
ATTORNEY

Oct. 18, 1938.   S. W. SPARKS   2,133,874
METHOD AND APPARATUS FOR EXTRUDING METAL STRIPS
Filed Aug. 6, 1936   8 Sheets-Sheet 6

INVENTOR
STANLEY W. SPARKS.
BY William T. Teyrer
ATTORNEY

Oct. 18, 1938.   S. W. SPARKS   2,133,874
METHOD AND APPARATUS FOR EXTRUDING METAL STRIPS
Filed Aug. 6, 1936   8 Sheets-Sheet 7
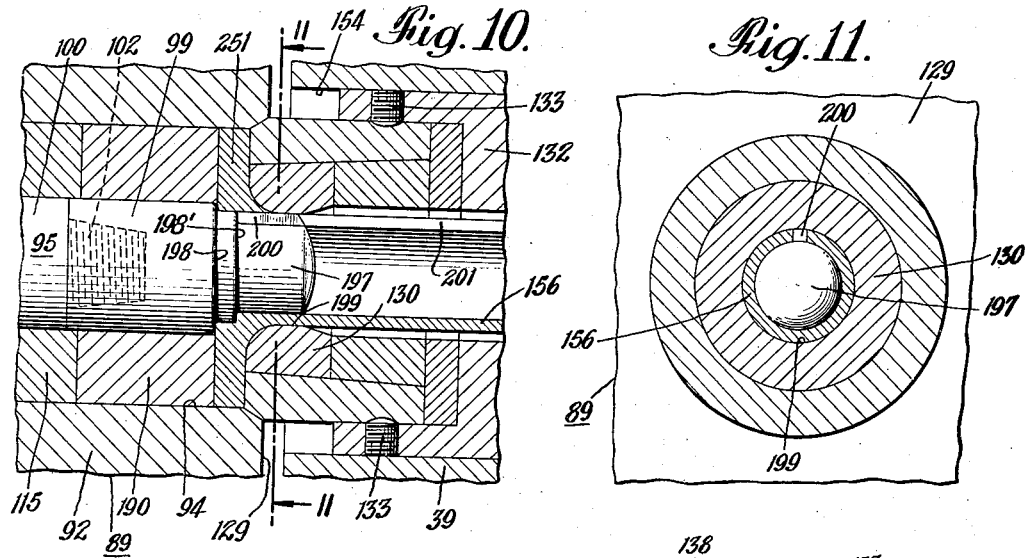
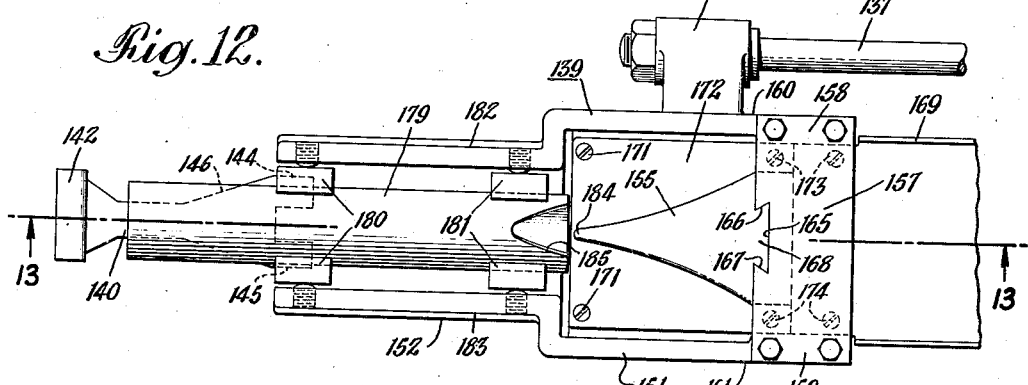
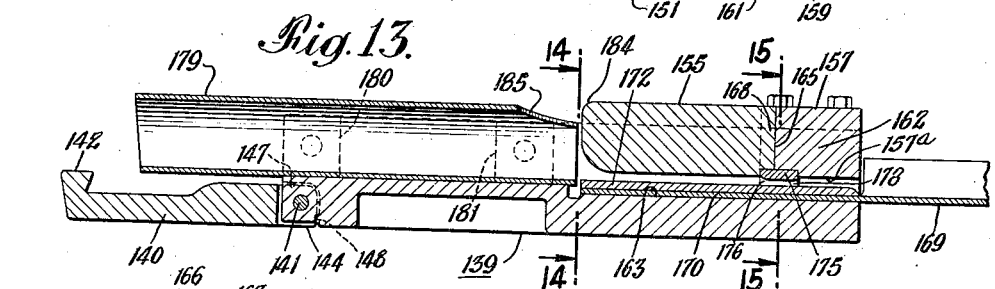
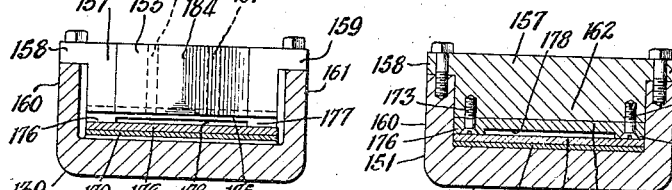
INVENTOR
STANLEY W. SPARKS.
BY William F. Heyrer
ATTORNEY Patented Oct. 18, 1938

2,133,874

UNITED STATES PATENT OFFICE 2,133,874

METHOD AND APPARATUS FOR EXTRUDING METAL STRIPS

Stanley W. Sparks, Norwalk, Conn., assignor to Sparks Processes, Inc., Norwalk, Conn., a corporation of Connecticut Application August 6, 1936, Serial No. 94,508

28 Claims. (Cl. 29—33)

My invention relates to the production of flattened metal sheets or strips by hot extrusion.

In the production of metal in sheet or strip form the usual procedure has been to employ a number of hot rolling mill operations to reduce the heated cast metal slab to the desired final form ready for cold working. This procedure has proved to be costly and to often result in a product which is imperfect.

It is, therefore, an object of the present invention to provide an apparatus and a process which will produce metal in strip or sheet form with less cost and with greater speed than the rolling mill apparatus and processes heretofore used, while at the same time improving the quality of the finished product; thereby, eliminating hot strip rolling.

To this end, there is provided by the present invention an apparatus which produces the flattened metal strip by pre-working the metal through upsetting and enlarged piercing thereof and in the same continuous operation forcing the so worked metal through an extrusion die to form a tubular metal strip, splitting or slotting it longitudinally and subsequently opening and flattening it.

In apparatus developed up to the present time for forming metal sheets or strips there have existed certain inherent deficiencies. Among these deficiencies is the lack of the provision of a completely satisfactory means for quickly loading the apparatus with the blank to be extruded and for enabling the apparatus to begin its strip forming operation immediately thereafter.

The overcoming of the above deficiency is therefore an important object of the present invention. Failure to provide means for this purpose results in a considerable cooling of the blank before the commencement of the extruding operations, resulting in the necessity of greater pressures, consequent greater wear on the forming tools and greater strain on the entire apparatus. Furthermore, because of the unequal cooling of the different portions of the blank the flow of metal during the extrusion operation is not uniform in all parts of the blank. This causes the lack of uniform physical characteristics, the formation of laminations in the product being extruded and results in extra large nubbins or stubs and consequently in a scrapping of a large percentage of the metal.

An important feature of the invention resides, therefore, in the provision of an apparatus in which a blank may be easily and quickly inserted in the blank container and which immediately following the insertion of the blank in the container is in proper adjustment for the commencement of the work and extrusion operations.

Yet another important feature of the invention resides in subjecting an unworked blank to a preliminary working in the extrusion apparatus before the commencement of the actual extruding operation.

Prior practice in the extrusion art has been to pre-work the blank in a separate series of operations before placing it in the extrusion apparatus. This practice necessitated special handling and additional apparatus including the reheating of the blank after the working and before its insertion in the extrusion apparatus, with resultant consumption of considerable time and addition to the manufacturing cost of the finished product.

The present invention contemplates the placing of an unworked blank, usually of a round or square blank, preferably round and of smaller diameter than the container bore, in the extrusion apparatus and upsetting the same by the application of pressure to increase its diameter and decrease its length, thus working the molecular structure into a more homogeneous and satisfactory condition for the extruding operation which immediately follows in the same machine and resulting in a more satisfactory final product. A complemental working of the metal constituting another feature of the invention is described hereinbelow.

In the course of investigations made by the present inventor in an effort to solve the problem of devising a hot extrusion apparatus that would materially reduce the amount of scrap material, certain important discoveries were made.

It was found that by piercing the heated blank in the container with a piercing tool having approximately a diameter of one third, and preferably slightly greater than one third, that of the upset blank prior to the direct extrusion of the blank by the ram through the tube forming aperture of the die that there was a more uniform flow of metal, resulting in considerable reduction in the amount of scrap material.

With a blank not so pierced the temperature in the core remains at a temperature much in excess of that of the outer portions of the blank which are cooled by both radiation and conduction. The more plastic metal in the central portion of the blank is diffused fanwise into the molecular structure of the metal in the outer portion of the blank which is at a lower temperature and hence less plastic and which, as it is forced into the restricted extrusion aperture, moves inwardly toward the more plastic inner portion causing the backward fanwise flow, above mentioned. Laminations then begin to form due to the back flow, increasing the resistance of the metal being extruded. Increase in the extrusion pressures to compensate for this increased resistance, while enabling a somewhat further extrusion, results in the production of laminations in the extruded articles. Consequently it is necessary to stop the extrusion process while a large percentage of the blank remains unextruded.

In addition to the equalization of temperatures in the blank by the pre-piercing of the blank with an equalizing tool, which should be of a diameter preferably at least one third that of the blank when it fills the container, there is provided as a further feature of the invention a means comprising a shoulder on the equalizing and piercing member, spaced a predetermined distance from and facing the die, which acts somewhat in the manner of a dam to prevent the adverse rearward flow, folding back, and building up of laminations in the blank prior to its extrusion through the tube forming aperture.

A further feature of the invention flowing from the piercing of the blank prior to its extrusion through the die with a member having a diameter preferably at least one third of the diameter of the upset blank is the additional working of the metal in the blank resulting therefrom. Because of the forcing of the enlarged piercing tool through the heated blank there is a dual working of the metal by pressure from the inside as well as by pressure in the outer or wall portions of the blank and there results in the finished product a highly homogeneous structure free from piping, blow-holes, and gas-pockets common in unworked or semi-worked blanks.

A further feature of the invention resides in the provision of a means which is movable to a position to stop the forward movement of the piercing or equalizing member after movement of the latter to a predetermined position relative to the die and which may be withdrawn after the completion of the extrusion movement of the ram, to permit a further movement of the piercing tool to sever the extruded article from the nubbin or stub left in the container.

Yet another feature of the invention resides in the provision of a simple and efficient means for locking in operative association with the blank container, a die which is movable by a piston from a position spaced from the container into operative association therewith.

A complemental feature is the provision of a structure wherein the special stops may likewise and concurrently be lifted to a raised or inoperative position.

A still further feature of the present invention is the provision of a novel structure wherein gravity alone is used to quickly move stops into working or operative position.

Other and more specific objects and features of the invention residing in advantageous forms, combinations and relations of parts will hereinafter appear.

In the drawings, which illustrate the present preferred embodiment of the invention:

Figure 1 is a side view of the apparatus showing the relationship of the various parts, one with the other, immediately prior to the placing of the heated blank in the container.

Fig. 2 is a detail view showing the final slug or nubbin after its severance from the extruded tubular strip.

Fig. 2a is a view of the extruded metal strip showing its form at different stages following passage through the die.

Fig. 3 is a view partly in section taken on the line 3—3 of Fig. 1 showing the means for locking the movable die in operative association with the blank container, part of the means for limiting movement of the blank piercing means beyond a predetermined position relative to the die, and the means for controlling the movement of each of the above named means.

Fig. 4 is a view partly in section taken on the line 4—4 of Fig. 1 showing operating and control means for the stops utilized for limiting and for permitting movement of the blank piercing and temperature equalizing member to a predetermined position relative to the die.

Fig. 5 is a sectional view taken on the line 5—5 of Fig. 4 showing the spring pressed locking means for maintaining the piercing rod movement limiting stops in an inoperative or withdrawn position.

Fig. 6 is a view partly in section taken on the line 6—6 of Fig. 4, showing in detail one of the pair of piercing rod movement limiting stops.

Fig. 10 is an enlarged detail view showing the relation of the die, ram and piercer at the end of the extrusion movement of the ram.

Fig. 11 is a sectional view taken on the line 11—11 of Fig. 10, showing the relation of the die, the blank piercing member, and the slot forming key.

Fig. 12 is an enlarged detail view showing the movable trough to which is secured the tube opening and flattening plow, and guides, and which is adapted to have associated therewith the die and die carrying head.

Fig. 13 is a detail sectional view taken on the line 13—13 of Fig. 12.

Fig. 14 is a detail sectional view taken on the line 14—14 of Fig. 13, showing the tube opening and flattening plow and associated guide channel.

Fig. 15 is a detail sectional view taken on the line 15—15 of Fig. 13, showing the guideway through which the strip passes following the initial opening and flattening action of the plow.

Figure 7:
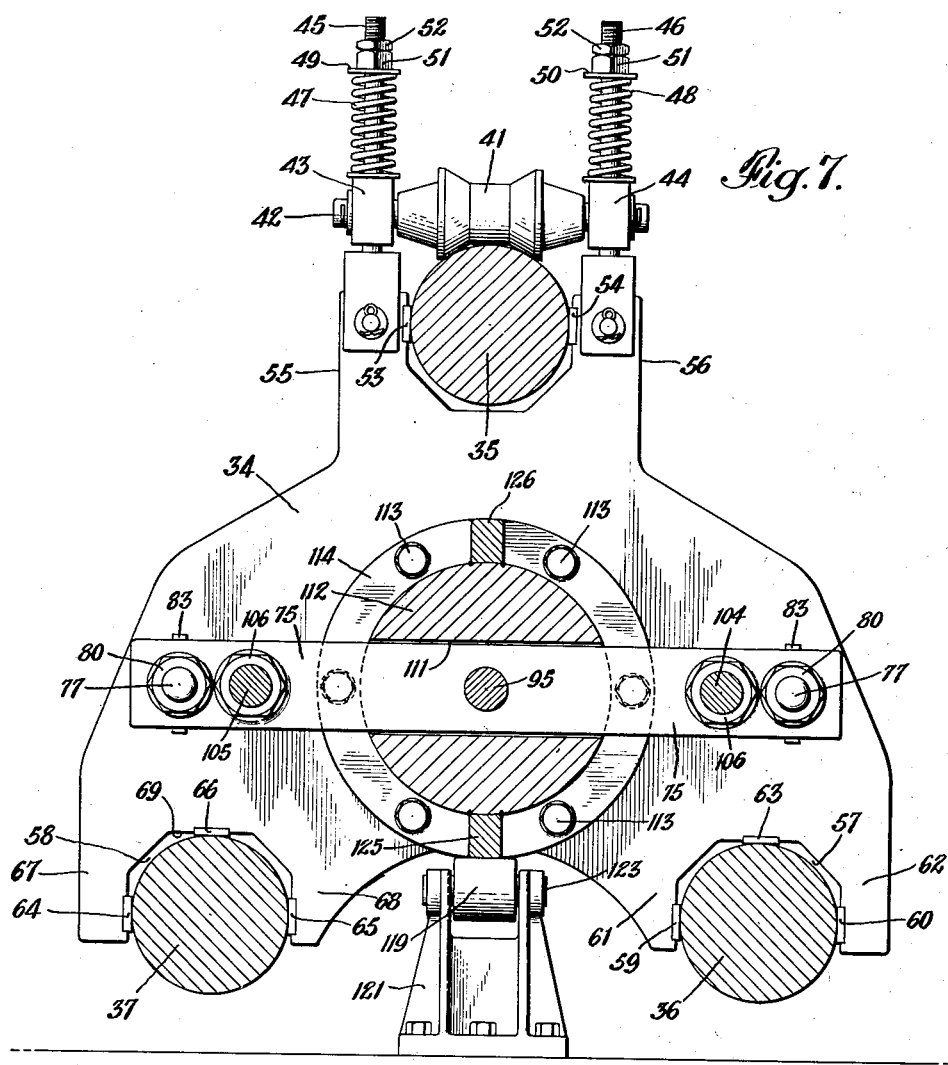
Fig. 7 is a sectional view taken on the line 7—7 of Fig. 1, showing the ram actuating crosshead and the manner of its support in the apparatus.

Figs. 17, 17a, 18, and 19 are detail views of the blank, showing its relative size and shape at different stages of its working, preparatory to being extruded through the forming die.

Referring to the drawings in detail, there is shown a housing 30 in which are located operating pressure cylinders. In Fig. 1, an end 31 of a hydraulic pressure cylinder 32, centrally positioned in the housing, is seen projecting outwardly therefrom. In operative association with the centrally positioned cylinder 32 and reciprocable therein is a piston 33 connected to a ram actuating crosshead 34 which is carried by and movable longitudinally of an upper tie rod 35 and a pair of lower tie rods 36 and 37, which extend longitudinally of the apparatus and are each supported at one end by the housing 30 and adjacent the other end by a housing 38 having front and rear plates 39 and 40 respectively spaced longitudinally of the rods.

A roller 41 carried by the ram actuating crosshead 34 supports the latter on the upper tie rod, and serves to reduce frictional resistance during the reciprocation of the crosshead. The roller, as clearly illustrated in Fig. 7, is carried by a shaft 42 extending between and supported by a pair of collars 43 and 44 slidably mounted on a pair of upstanding rods 45 and 46 secured to the crosshead. Springs 47 and 48 positioned on the upstanding rods and interposed between the collars 43 and 44 and followers 49 and 50, while serving to normally maintain the roller in fixed relation with the crosshead, permit sufficient floating to facilitate movement thereof. Adjustment of the pressure on each of the springs is accomplished by nuts 51 which may be locked in an adjusted position by means of lock nuts 52.

Wear plates 53 and 54 on upstanding arms 55 and 56 formed on the crosshead 34 engage opposite sides of the upper tie rod and serve to maintain the crosshead in proper association therewith.

Association is maintained between the crosshead and the lower tie rods 36 and 37 by providing inverted channels 57 and 58 in the lower face of the crosshead for the receipt of the tie rods. Wear plates 59 and 60 located in downwardly extending arms 61 and 62 formed on the crosshead and constituting the sides of the channel 57 serve to prevent lateral movement of crosshead relative to one lower tie rod 36, while a wear plate 63 located in the portion of the crosshead constituting the base of the channel serves to support the crosshead on the tie rod. Similar wear plates 64, 65 and 66 located in the arms 67 and 68 and base 69 of the channel 58 serve to maintain and support the crosshead relative to the other lower tie rod 37.

Located in the housing 30 at either side of the ram actuating pressure cylinder 32 is a pair of hydraulic pressure cylinders, the end 70 of one of the cylinders being seen projecting outwardly from the housing in Fig. 1. Reciprocable in this pair of cylinders are piston rods 71 and 72 respectively, which pass through suitable openings 73 and 74 in the ram actuating crosshead 34 to be connected to a blank piercer actuating crosshead 75 by connectors 76.

Each of these connectors 76 is disclosed as comprising a shank portion 77 and an enlarged head 78 in which there is formed a recess 79 for the receipt of one of the piston rods 71 and 72. Movement of the connectors relative to the crosshead is prevented by nuts 80 associated with the shank portions 77 which abut one side of the crosshead, and by the enlarged heads 78 of the connectors which abut shoulders 81 in openings 82 formed in the crosshead for the accommodation of the connectors. Relative movement between connectors and the piston rods is prevented by pins 83 which pass through complementary slots 84 and 85 formed in the piston rods 71 and 72 and in the enlarged heads of the connectors.

Figures 9, 9A:
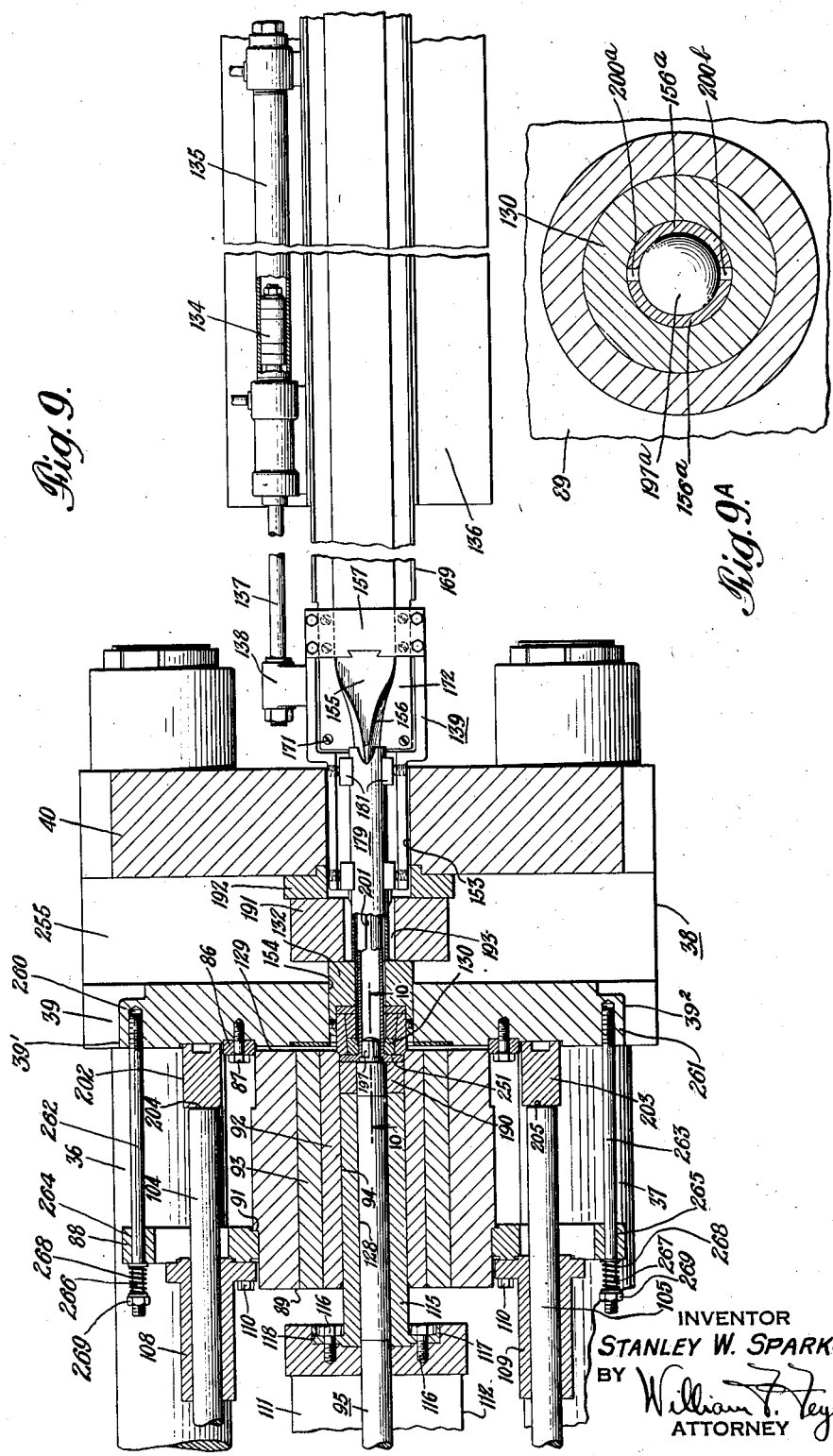
Fig. 9 is a fragmentary view partly in section taken on the line 9—9 of Fig. 1 showing the position of the parts at the end of the extrusion operation and showing the opening and flattening of the extruded longitudinally slotted tube.
Fig. 9a is a fragmentary cross sectional view, similar to Fig. 11, showing a double key structure to split one tube into two strips.

Supported by a supporting ring 86 secured to the front plate 39 of the housing 38 by a plurality of screws 87 and by a supporting plate 88 supported on the tie rods 35, 36 and 37 is a container 89 adapted to receive a heated metal blank 90. Longitudinal movement of the container is limited in one direction by the front plate 39 of the housing 38 and in the other direction by the supporting plate 88 which is engageable with an annular shoulder 91 formed on the container. Preferably the front plate 39, as shown in Fig. 9, may on each side 39' and 39² be provided with lugs 260 and 261 threaded to receive rods 262 and 263 extending through suitable holes 264 and 265 at opposite sides of the supporting plate 88. The forward ends 266 and 267 of the rods are provided with springs 268 and nuts 269 which, through the supporting plate 88, normally urge the container 89 toward the front plate of the rear housing. The springs 268 allow the container to yield or move axially a slight extent when a wedge pushes a die firmly in engagement with the end of the container as hereinafter described in detail.

Preferably, and as shown, the container is provided with a pair of concentric sleeve members 92 and 93 secured thereto in any suitable manner, the inner one 92 of which is constructed of material having a particularly high heat resistance characteristic and provides the chamber or bore 94 in which the heated blank 90 is inserted.

Movable with the crosshead 75 toward the container from the retracted position, shown in Fig. 1, is a blank piercing and temperature equalizing member 95, preferably one third the diameter of the bore of the container, or larger. Nuts 96 and 97 cooperate with an annular shoulder 98 formed on the piercing member to maintain the latter in fixed relation with the crosshead.

Preferably, and as shown, to facilitate and make possible economical replacement of worn sections the blank piercing member 95 is made up of a plurality of parts including a tip 99, an intermediate member 100 and main member 101 secured together by threaded connections 102 and 103. It is to be understood, however, that it is within the purview of the present invention to construct the blank piercing member of one part as well as of any number of parts.

Also connected to the blank piercer actuating crosshead 75 are a pair of stop rods 104 and 105 spaced at either side of and extending parallel to the blank piercing and temperature equalizing member 95. Connection between each of the stop rods and the crosshead may be advantageously achieved by providing nuts 106 and 107. Bearings 108 and 109 connected to the supporting plate 88 by screws 110 serve to support and guide the stop rods as they are reciprocated with the crosshead.

Extending forwardly from the ram actuating crosshead 34 and having an opening 111 therein to permit relative movement of the piercer crosshead 75 is a ram carrying member 112. Rigid association between the member 112 and the ram actuating crosshead is achieved by a plurality of screws 113 which pass through the flange portion 114 of the member. Association of a ram 115 with the member 112 is effected by a plurality of screws 116 which hold the flange portion 117 of the ram securely in a recess 118 formed in the end of the member 112 remote from the crosshead.

Serving as supports for the ram carrying member 112 and to maintain it in vertical alignment are a pair of rollers 119 and 120 rotatably associated with a pair of supports 121 and 122 respectively by the rods 123 and 124. A runner plate 125 suitably affixed to the underside of the ram carrying member is utilized to reduce friction between the rollers and the supported member. A similar runner plate 126 is affixed to the upper side of the ram carrying member and is available for use by merely inverting the ram carrying member in the event that the first runner plate becomes worn.

Coaxial openings 127 and 128 formed in the member 112 and ram 115 respectively, accommodate the blank piercing member 95 and permit independent longitudinal sliding movement thereof.

Figure 8:
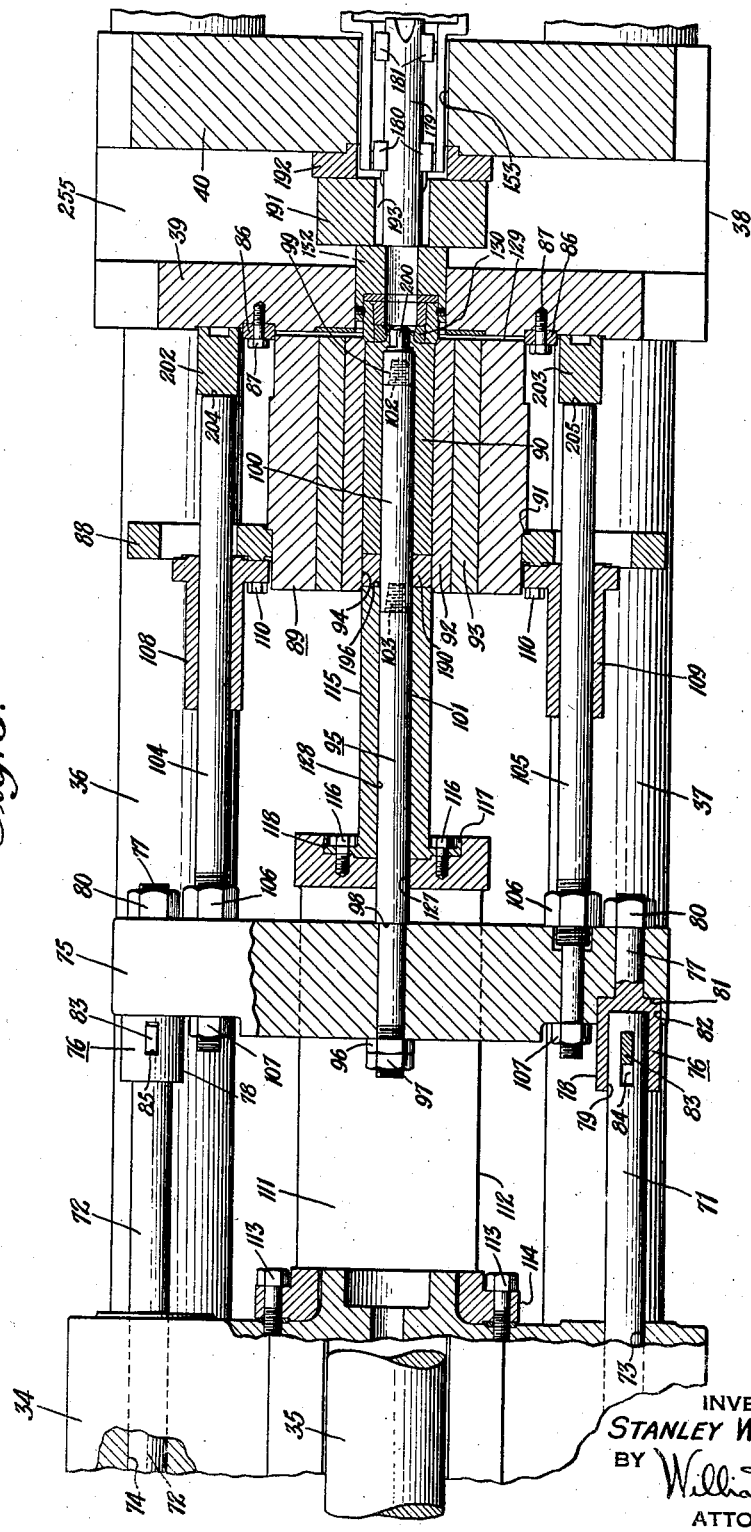
Fig. 8 is a fragmentary view partly in section taken on the line 8—8 of Fig. 1 showing the blank charged or loaded in the container and pierced.

Movable in alignment with the longitudinal axis of the blank chamber 94 of the container 89 from a retracted position spaced from the housing 38 and the container as shown in Fig. 1 to an advanced position in operative association with the open muzzle end 129 of the container remote from the ram 115, as shown in Fig. 8, is a matrix or die 130 secured in a suitable recess 131 in a die carrying head 132 by set screws 133.

Movement of the die and die carrying head is accomplished through an indirect connection to a piston 134 in an operating pressure cylinder 135 shown as conveniently supported on and secured to a supporting table 136 spaced from the rear plate 40 of the housing 38.

The connection between the die carrying head 132 and the piston comprises an extension rod 137 secured at one end to the piston 134 and at the other end to a lug 138 extending to one side of a trough member 139. Coextensive movement of the trough member 139 and the die carrying head is assured by the connecting finger 140 connected to the trough member by the pin 141 and adapted to be connected to the die carrying head 132 by an upstanding transversely extending lug 142 formed at one end of the finger 140 and which fits in a complementary transversely extending recess 143 in the under side of the die carrying head. Pivotal movement between the finger and the trough member is limited by the engagement of arms 144 and 145 of the yoke portion 146 of the finger with shoulders 147 and 148 partially encompassing the arms 144 and 145 and formed on the trough member.

The trough member 139 is formed with wide and narrow portions 151 and 152 respectively, the latter portion, when the die carrying head has been moved to the advanced position shown in Fig. 9, being supported in a bore 153 in the rear plate 40 of the housing 38. When in this advanced position the die carrying head 132 is supported in a similar bore 154 in the front plate 39 of the housing 38.

Associated with the wide portion 151 of the trough member 139 is a plow or opening and spreading device 155 adapted to spread open and flatten a longitudinally slotted metal tube 156 after its extrusion through the die 130. A particularly advantageous manner of associating the plow with the trough member 139 is illustrated in Figs. 12 through 15 and comprises the provision of a block 157 having flange portions 158 and 159 supported on side walls 160 and 161 respectively of the wide portion 151 of the trough member and having a main body portion 162 extending downwardly in the trough member and spaced from the bottom 163 thereof. Formed in the forward face 164 of the block is a recess 165 having side walls 166 and 167 extending at an angle rearwardly toward the flanges 158 and 159. A complementary lug 168 formed on the plow is adapted to fit in the recess and prevent longitudinal movement between the plow and block.

Also associated with the wide portion 151 of the trough member is a channel member 169 which has a tongue 170 extending forwardly to overlie the bottom 163 of the trough member 151 and be secured thereto by a plurality of screws 171. Suitably affixed to the tongue 170 and overlying the same is a hardened metal strip 172 over which the opened and flattened metal tube 156 passes.

Secured to the underside of the block 157 by a pair of screws 173 and 174 and closing the lower opening of the recess 165 is a hardened metal plate 175 having spaced portions 176 and 177 adapted to rest upon the metal strip 172 and having a central recess 178 to permit the passage therethrough of the flattened metal tube. This plate serves not only to support the plow but also to guide the opened and flattened metal tube, now in the form of a flattened strip, into the guideway 157a formed by the block 157, the hardened strip 172 and the side walls 160 and 161 of the trough.

A guiding tube 179 held in longitudinal alignment with the die 130 and the plow 155 by two pairs of clamps 180 and 181 secured to side walls 182 and 183 of the narrow portion of the trough, serves to guide and direct the longitudinally slotted metal tube as it passes fom the die to the plow. Preferably, and as shown, the guiding tube is made of such a length that one end abuts the die carrying head while the other end is positioned in close proximity to the point 184 of the plow. A cut out portion 185 in the guide tube may, as shown, be advantageously provided at the end adjacent to the plow in order to permit a partial spreading of the slotted metal tube.

In the operation of the apparatus a metal blank 90, usually of substantially rectangular shape, after being heated to the proper extrusion temperature, is placed upon a charging stand 186 as shown in Fig. 1. If desired the stand 186 may be positioned adjacent the breach 187 of the container in which event longer left hand travel of the crossheads 34 and 75 is provided for, but preferably and as shown it is positioned for charging the blank at the muzzle end 129 of the container.

In the particularly advantageous charging arrangement disclosed, the charging stand 186 is positioned intermediate the supporting table 136 and the rear plate 40 of the housing 38. The charging stand comprises a lifting piston 188 on which is positioned a cradle member 189 in which the heated blank is placed. Following the placing of the blank in the cradle member the lifting piston is moved upwardly by hydraulic or other suitable means until the blank is in coaxial alignment with the die and the bore 153 in the rear plate 40 of the housing 38.

Following the coaxial aligning of the blank and bore 153 the die head 132 is moved toward the left, as viewed in Fig. 1, by the operation of the piston 134 and pressure cylinder 135 to force the blank through the bore 153 in the rear plate and the bore 154 in the front plate of the housing and into the blank chamber 94 of the container 89 against a dummy block 190 positioned therein.

After the die head 132 has been moved to the advanced position just described, in which position the die or matrix 130 is in operative association with the muzzle end 129 of the container, a wedge 191 is moved downwardly between the die carrying head 132 and a wedge backing plate 192 suitably secured to the rear plate of the housing 38. Preferably, and as shown best in Fig. 3, the wedge is formed with a central recess 193 in its under face 193' adapted to overlie the guiding tube 179. In order that the wedge may effectively serve to hold the die head in the advanced position, the rear face 194 thereof is tapered to achieve a wedging action with a complemental tapered front face 195 of the die carrying head against which the wedge is urged by the wedge backing plate 192.

With the construction just described, which constitutes one of the important features of the invention, a very rapid charging of the container is made possible, immediately after which the die is quickly locked securely in place by the wedge. The importance of rapid charging is that failure to provide a means for achieving this end results in a considerable cooling off of the blank before the beginning of the actual extrusion operations. This results in the necessity of utilizing greater extruding pressures as the cooler metal is less plastic, and further results in greater wear on the forming tools and upon the entire apparatus. With the construction disclosed not only is a very rapid charging of the container made possible, but immediately following the charging operation the apparatus is in condition for the beginning of the metal working procedure.

Following the charging of the container and the locking of the die in operative association therewith the ram 115 is brought forward against the dummy block 190 which contacts with the end of the rough blank, which may be in either the form shown in Fig. 17 or 17a. Usually it is in the form shown in Fig. 17a, wherein the diameter is somewhat smaller than the bore of the container. Pressure is then applied to the extrusion ram through the crosshead 34 causing the blank to be upset, thereby increasing its diameter until it is the same diameter as the bore of the container and shortening the length of the blank, shown diagrammatically in Fig. 18.

This upsetting, or pre-working of the blank, is of particular importance in that it is rendered in superior condition for the extruding operations to follow and rearranges the molecules of metal which results in a better final product. The fact that this upsetting, or pre-working of the blank, is made possible after the blank has been inserted in the container eliminates the necessity of special handling and working of the blank prior to its insertion in the apparatus.

After the upsetting operation above described. the ram 115 is moved backwardly by the crosshead 34 to leave a space between the forward end 196 of the ram and the dummy block 190. This permits the elongation of the blank during the blank piercing operation to be next described.

In the blank piercing operation the blank piercing and temperature equalizing member 95 is moved in the direction of the die by the actuating crosshead 75 to move through and pierce the center of the blank. During the piercing operation, the blank is elongated to a position shown in Fig. 8, and as shown diagrammatically is changed from the shape shown in Fig. 18 to that shown in Fig. 19.

The piercer member, as heretofore explained, has a diameter at least one third that of the upset blank. This piercing of the blank by a piercer of considerable size is of importance in that it tends to make a more homogeneous metal structure and to equalize the temperatures in the blank, thus making for a uniform metal flow as heretofore pointed out.

Figure 16:
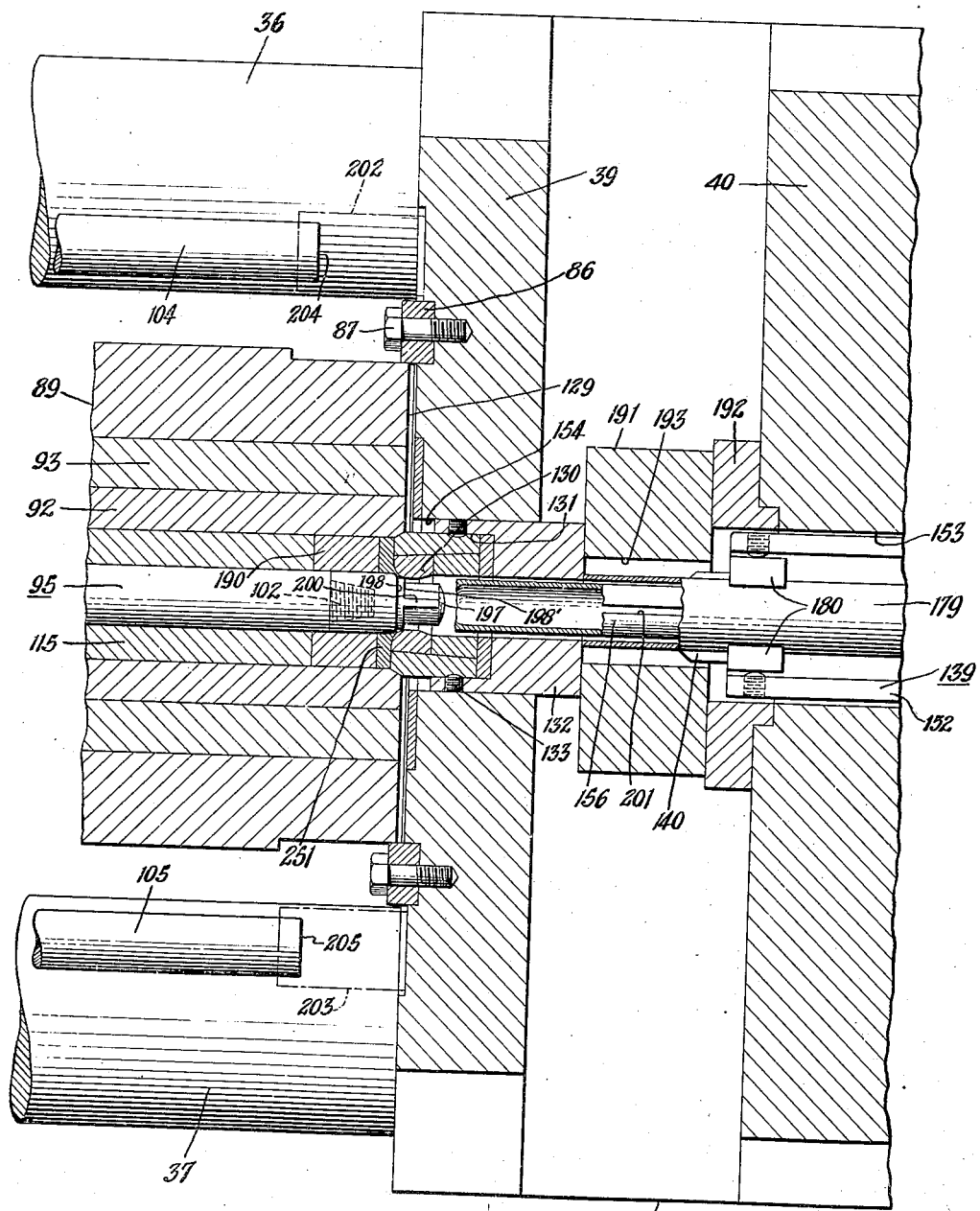
Fig. 16 is a fragmentary sectional view of the apparatus showing the relation of the parts immediately following the cutting off of the nubbin by the cooperation of the piercing member and the die.

Formed at the forward or piercing end of the piercing member is a nose portion 197 of a diameter less than that remaining portion of the piercer member. An annular shoulder 198 facing the die, may be provided at the point at which the nose portion projects forwardly from the remaining portion of the piercing member. Preferably a secondary shoulder 198' is provided on the nose portion 197 of substantially the same diameter as the die to strip the extruded tube 156 from the nubbin 251 as shown in Fig. 16 particularly.

After the piercing member has moved forwardly to the predetermined position, shown in Fig. 8, the shoulder 196 is spaced from the die and the nose portion 197 of the piercing member extends into an opening 199 in the die 130 and forms with the die an aperture for the extrusion therethrough of a longitudinally slotted metal tube. A key 200 formed on the nose portion of the piercing member cooperates with the die to form the slot 201.

In order to assure the arresting of the movement of the piercing member in the predetermined position disclosed in Fig. 8 there are provided a pair of stop blocks 202 and 203 movable to a position between the free ends 204 and 205 of the stop rods 104 and 105 respectively and the front plate 39 of the housing 38.

The movement and control of the stop blocks 202 and 203 and the wedge member 191 constitutes another of the important features of the invention and will now be described in detail.

Positioned between the front and rear plates 39 and 40 respectively of the housing 38 is a block 206 on which there is secured and supported an operating pressure cylinder 207 having therein a piston 208 which actuates a crosshead 209 through the intermediary of an extension rod 210 secured to the crosshead by a suitable nut 211. Extending downwardly from and suitably connected thereto by nuts 212 and 213 and nuts 214 and 215 are a pair of wedge moving rods 216 and 217 respectively which pass downwardly through suitable bores 218 and 219 in the block 206 to be connected to the wedge member 191 by the threaded connections 220 and 221.

Slidably associated with the wedge moving rods 216 and 217 are the reach arms 222 and 223 respectively. Extending downwardly from and secured to each of the reach arms 222 and 223 by nuts 224 and 225 and the nuts 226 and 227 are rods 228 and 229 respectively, having secured to their lower ends by threaded connections 230 and 231 the stop blocks 202 and 203.

When in an upward or retracted position, such as shown in Figs. 3 and 6, the reach arms are supported on collars 232 and 233 secured to the wedge moving rods 216 and 217, thus maintaining the stop blocks in an inoperative position as contrasted to the operative position shown in Fig. 8. When the pressure cylinder is operated to move the wedge 191 to the locking position shown in Fig. 8, the rods 228 and 229 carrying the stop blocks 202 and 203 are held in an upward or inoperative position by spring pressed pins 234 and 235 which engage in suitable recesses 236 and 237 formed in the rods. The pins are carried in spring cages 238 and 239 which are in screw threaded relation with guiding collars 240 and 241 encircling the rods 228 and 229 and suitably bolted to the front plate 39 of the housing 38. Springs 242 in each of the spring cages engage with shoulders 244 on the locking pins and normally maintain the latter in the recesses 236 and 237.

When it is desired to release the rods 228 and 229 to permit the stop blocks 202 and 203 to fall by gravity into the operative position, shown in Fig. 8, for limiting movement of the piercing member beyond a predetermined position, the locking pins are moved out of locking position by pulling a rod 246 which is indirectly connected thereto through the rods 247 and 248 and the intermediate centrally pivoted arm 249 which is secured to the front plate 39 of the housing 38.

Following the movement of the piercing member to the predetermined position above described, power is applied through the hydraulic operating cylinder 32 to the ram 115 which forces the dummy block 190 in contact with the end of the pierced blank 90 and forces the plastic metal of the blank through the aperture defined by the die 130 and the nose 197 of the piercing member. The metal thus extruded, being in the form of a longitudinally slotted tube, passes through the guiding tube 179 to the plow 155 where it is spread open, flattened and passed through the guide way 157a to the guide formed by the channel member 169. Preferably the metal strip is wound about a large spool 250, such as shown in Fig. 1, after it leaves the channel member.

In Fig. 2a there is shown in detail the form of the extruded slotted metal tube progressively immediately following its extrusion from the die, during the plowing or spreading operation and after it has been completely flattened.

The flattened metal strip 156 after leaving the channel member 169 still has sufficient temperature within its structure to enable its being guided without further heating into a conventional design of rolls or into one of a series of continuous strip rollers which would further reduce the thickness of the strip to meet the commercial practice of rolling strips into hot rolled finished sheets or strips.

The extrusion procedure above described, in which an unworked blank is first worked and pierced and then forced through an extrusion die, constitutes one of the most important features of the invention. By this method of extrusion there is a pressure working of the blank from the inside as well as a pressure working of the metal in the outer portions of the blank. This dual working of the metal improves the molecular structure of the blank and definitely eliminates all of the inherent defects in the cast blank, such as piping, blow-holes, and gas-pockets, and such working of the metal produces at the finished product a highly homogeneous structure, entirely free from the aforesaid defects.

After the strip has been completely extruded there still remains in the container a stub or nubbin 251, as shown clearly in Fig. 10. In order to enable the severing of the nubbin from the extruded portion of the blank, the stop blocks 202 and 203 are moved to the inoperative position shown in Fig. 6 by the operation of the operating cylinder 207. In this position the stop blocks are maintained by means of the spring pressed locking pins 234 and 235. Following the lifting of the stop blocks the pressure cylinder is again operated to move the wedge into locking position. The piercing member is then moved forwardly into the mouth of the die by the operation of its operating pressure cylinders, the shoulder 198 on the piercing member passing through the nubbin and cooperating with the face of the die 130 to punch out or shear the tube from its integral connection with the nubbin. Preferably, however, the secondary shoulder 198' is provided to enter the die 130 and thereby sever the tube without leaving a flange on the rear end thereof.

After the extruded tube and the nubbin have thus been separated the wedge is again raised through the operation of the pressure cylinder 207 and the die head and tube flattening and guiding means are moved into the retracted position to rest upon the table 136, as shown in Fig. 1. When in the retracted position the channel member 169 is disclosed as resting on a second table 252.

The ram is then moved forwardly to eject the dummy block 190 from the bore of the container together with the nubbin 251. A hook plate 253 slidable on the slightly inclined surface 254 of a bottom block 255 positioned between the front and rear plates 39 and 40 of the housing 38, as shown in Fig. 3, facilitates the removal of the hot dummy block and the nubbin. A further function of the hook plate is to guide and support the blank 90, especially a long blank, between the front and rear plates of the housing 38 during the charging of the container 89.

Following the removal of the dummy block and the nubbin, the container is cleaned out, and a cool dummy block is placed into the bore or blank chamber of the container. The hook plate 253 may also be used to aid in the placing of the fresh dummy block in the container. Another blank is then placed upon the charging stand, as shown in Fig. 1, preparatory to another series of operations by the apparatus.

In the modification, shown in Fig. 9a, two keys 200a and 200b rather than one are shown formed on the nose 197a of the piercing member. One of these keys 200a is located on the upper side of the nose as in the case of the preferred form first described and cooperates with the die to form a longitudinally extending slot in the extruded tube in the same manner as in the preferred form. The other key 200b is preferably spaced 180 degrees from the first key, being located on the under side of the piercer nose 197a. This second key cooperates with the die as does the first key to form a longitudinally extending slot in the tube as it is extruded through the die.

The guiding tube 179 directs the divided or double slotted tube 156a to the plow 155 in the same manner as it does the tube having only one longitudinally extending slot. Upon meeting the plow, the two sections of the split tube are spread, flattened and fed into the guide way formed by the block 157 the hardened metal strip 172 and the side walls 160 and 161 of the trough member. In the guide way the two sections of the split tube are further flattened and are fed onto the guide channel 169 ready for any further processing or winding thereof that is deemed necessary. The operation of the various moving parts of the apparatus is exactly the same during the formation of the two flattened metal strips as in the case of the formation of the single metal strip first described.

From the foregoing it is seen that the blank prior to extrusion through the die is subjected to a considerable working in order that the metal in the finished product may be particularly homogeneous and free from defects.

In Figs. 17, 17a, 18 and 19 there are illustrated the progressive forms of the blank prior to the extrusion operations.

Fig. 17 shows the relative size of a rectangular shape of rough blank at the time it is first placed in the container prior to the upsetting.

Fig. 17a shows the relative size of a preferable round rough blank prior to the upsetting.

Fig. 18 shows the longitudinal compression and lateral expansion of the blank, shown in Fig. 17 or 17a, after the upsetting operation.

Fig. 19 shows the elongation of the blank caused by the piercing operation.

These illustrations show clearly how the blank is first worked by longitudinal pressure and then worked by pressure from both the inside and the outside to elongate the same, all of these working operations being consecutively performed in the same container from which the finished product is extruded.

While the various actuating means for moving parts of the apparatus have been illustrated and described as hydraulic pressure cylinders, it is to be understood that the invention is not intended to be so limited. Mechanical actuating means, while not as effective and satisfactory as the hydraulic means, may nevertheless be substituted therefore.

Having thus described the invention, what is claimed as new is:

1. An apparatus for forming flattened metal strips including in combination a container for receiving a heated plastic metal blank; a die movable from a position spaced from said container into operative association therewith; means movable to lock said die in said operative association with said container; a blank piercing member movable in said container toward said die to a predetermined position relative to the latter, adapted to pierce said blank, and when in said predetermined position to form with said die an annular opening for the extrusion therethrough of a metal tube; means for forming a longitudinally extending slot in said metal tube; means for forcing said blank through said die subsequent to the movement of the piercing member, means movable with said die for opening and flattening said longitudinally slotted tube after its extrusion therefrom; and means for forcing said blank through said die.

2. An apparatus for forming flattened metal strips including in combination a container adapted to be charged with a heated metal blank; a die adapted to be locked in operative association with said container; a blank piercing member movable to a predetermined position relative to said die to cooperate therewith in the formation of an aperture for the extrusion therethrough of a longitudinally slotted metal tube; gravity actuated means movable from an inoperative position to a position for limiting movement of said blank piercing member beyond said predetermined position; means for forcing the blank through said die; means for opening and flattening said longitudinally slotted tube after its extrusion through said die; and means for withdrawing said gravity actuated means after the extrusion of said tube.

3. An apparatus for forming flattened metal strips including in combination a container for receiving a heated plastic metal blank; a die in operative association with said container; a blank piercing member movable in said container to a predetermined position relative to said die to form therewith an annular opening for the extrusion therethrough of a metal tube; means to limit movement of said blank piercing member beyond said predetermined position; means for extruding the blank through said annular opening; means for forming a longitudinally extending slot in said tube as the latter is extruded through said die; means for opening and flattening said longitudinally slotted tube; and means for withdrawing said movement limiting means for said blank piercing member after the extrusion of said tube to permit further movement of said blank piercing member to sever the extruded tube from the nubbin.

4. An apparatus for forming flattened metal strips including in combination a container for receiving a heated plastic metal blank; a die in operative association with said container; a blank piercing member movable in said container to a predetermined position relative to said die to form therewith an aperture for the extrusion therethrough of a longitudinally slotted metal tube; means to limit movement of said blank piercing member beyond said predetermined position; means for extruding the blank through said annular opening; a plow for opening and flattening said slotted metal tube; and a guide tube interposed between said die head and said plow for directing said slotted metal tube to the plow.

5. An apparatus for forming flattened metal strips including in combination a container adapted to be charged with a heated metal blank; a die carrying head movable toward said container into an advanced position; a die secured to said head; a stationary member spaced from said container and extending transversely the longitudinal axis thereof; a wedging member movable to a position between said stationary member and said die carrying head to lock the latter in said advanced position; a blank piercing member movable in said container toward said die and having means thereon cooperable with said die for forming a longitudinally slotted tube; a blank extruding ram movable in said container; and means for opening and flattening said longitudinally slotted tube after its extrusion from the die.

6. An apparatus for forming flattened metal strips including in combination a container having open ends, for receiving a solid plastic metal blank; a die, movable in alignment with the longitudinal axis of said container from a retracted position spaced from said container to an advanced position in operative association with one of the open ends thereof, whereby a blank may be forced into said container by said die; a metal extruding ram movable toward said die; a blank piercing member movable independently of said ram to extend forwardly therefrom toward and into a predetermined position relative to said die; a nose on said piercing member, having a reduced diameter, adapted when in said predetermined position to form with said die a forming aperture for the extrusion therethrough of a metal tube; means on said nose for forming a longitudinally extending slot in said tube as the latter is extruded through said die; means for opening and flattening said longitudinally slotted tube after its extrusion through said die; means for moving said blank piercing member through said solid blank to said predetermined position; means for subsequently moving said ram relative to said die to extrude the metal through said annular opening; means movable to lock said die in operative association with said container during said blank piercing and extruding movements; means movable to limit movement of said blank piercing members beyond said predetermined position; and means for withdrawing said last named means upon completion of the extruding movement of said ram to permit movement of said blank piercing member to sever said tubular metal strip from the nubbin in the container.

7. An apparatus for forming flattened metal strips including in combination a container having open ends, for receiving a solid plastic metal blank; a die movable in alignment with the longitudinal axis of said container from a retracted position spaced from said container to an advanced position in operative association with one of the open ends thereof, whereby a blank may be forced into said container by said die; a metal extruding ram movable toward said die in alignment with the longitudinal axis of said container, having a longitudinally extending bore therein; a blank piercing member closing said bore and movable therein independently of said ram to extend forwardly therefrom toward and into a predetermined position relative to said die; a nose on said piercing member, having a reduced diameter, adapted when in said predetermined position to form with said die a forming aperture for the extrusion therethrough of a metal tube; means on said nose for forming a longitudinally extending slot in said tube as the latter is extruded through said die; means movable with said die for opening and flattening said longitudinally slotted tube after its extrusion through said die; means for moving said blank piercing member through said solid blank to said predetermined position; means for subsequently moving said ram relative to said die to extrude the metal through said annular opening; means movable to lock said die in operative association with said container during said blank piercing and extruding movements; means movable to limit movement of said blank piercing members beyond said predetermined position; and means for withdrawing said last named means upon completion of the extruding movement of said ram to permit movement of said blank piercing member to sever said tubular metal strip from the nubbin in the container.

8. An apparatus for forming flattened metal strips including in combination, a container adapted to be charged with a heated metal blank; a die; a metal extruding ram movable toward said die; a blank piercing member movable toward said die; a shoulder on said piercing member, facing said die; a nose on said blank piercing member, extending from said shoulder, adapted when in a predetermined position with respect to said die to form therewith a shape-forming orifice for the extrusion therethrough of a tube; means for forming a longitudinally extending slot in said tube; and means for opening and flattening said longitudinally slotted extruded tube.

9. An apparatus for forming flattened metal strips including in combination, a container having a bore adapted to be charged with a heated metal blank; a die; a metal extruding ram movable toward said die; a blank piercing member having a diameter at least one-third that of said bore, movable toward said die; a nose on said blank piercing member, adapted when in a predetermined position with respect to said die to form therewith a shape-forming orifice for the extrustion therethrough of a tube; means for forming a longitudinally extending slot in said tube; and means for opening and flattening said longitudinally slotted extruded tube.

10. An apparatus for forming flattened metal strips including in combination, a container adapted to be charged with a heated metal blank; a die; a metal extruding ram movable toward said die; a blank piercing member movable toward said die; a shoulder on said piercing member, facing said die; a nose on said blank piercing member extending from said shoulder, adapted when in a predetermined position with respect to said die to form therewith a shape-forming orifice for the extrusion therethrough of a metal tube; stop means movable from an inoperative position to a position for limiting movement of said blank piercing member beyond said predetermined position; means for forming a longitudinally extending slot in said tube; and means for opening and flattening said longitudinally slotted tube.

11. An apparatus for forming flattened metal strips including in combination, a container adapted to be charged with a heated metal blank; a die; a metal extruding ram movable toward said die; a blank piercing member movable toward said die; a shoulder on said piercing member, facing said die; a nose on said blank piercing member, extending from said shoulder, adapted when in a predetermined position with respect to said die to form therewith a shape-forming orifice for the extrusion therethrough of a metal tube; stop means movable from an inoperative position to an operative position for limiting movement of said blank piercing member beyond said predetermined position; means for forming a longitudinally extending slot in said tube; means for opening and flattening said longitudinally slotted tube; and means for moving said stop means from the operative position to said inoperative position to permit further movement of said blank piercing member toward said die to sever said extruded slotted tube from the unextruded nubbin left in the container.

12. An apparatus for forming flattened metal strips including in combination, a container adapted to be charged with a heated metal blank; a die; a metal extruding ram movable toward said die; a blank piercing member movable toward said die; a shoulder on said piercing member, facing said die; a nose on said blank piercing member, extending from said shoulder, adapted when in a predetermined position with respect to said die to form therewith a shape-forming orifice for the extrusion therethrough of a metal tube; a stop rod movable with said blank piercing member; a stop means movable from an inoperative position to engage said stop rod for limiting movement of said blank piercing member beyond said predetermined position; means for forming a longitudinally extending slot in said tube; and means for opening and flattening said longitudinally slotted tube.

13. An apparatus for forming flattened metal strips including in combination, a container adapted to be charged with a heated metal blank; a die; a metal extruding ram movable toward said die; a blank piercing member movable toward said die; a shoulder on said piercing member, facing said die; a nose on said blank piercing member, extending from said shoulder, adapted when in a predetermined position with respect to said die to form therewith a shape-forming orifice for the extrusion therethrough of a metal tube; a stop rod movable with said blank piercing member; a stop means movable from an inoperative position to engage said stop rod for limiting movement of said blank piercing member beyond said predetermined position; means for forming a longitudinally extending slot in said tube; means for opening and flattening said longitudinally slotted tube; and means for moving said stop means to said inoperative position after completion of the extrusion movement of said ram.

14. An apparatus for forming flattened metal strips including in combination, a container adapted to be charged with a heated metal blank; a die; a metal extruding ram movable toward said die; a crosshead; a blank piercing member movable with said crosshead toward said die; a shoulder on said piercing member, facing said die; a nose on said blank piercing member, extending from said shoulder, adapted when in a predetermined position with respect to said die to form therewith a shape-forming orifice for the extrusion therethrough of a metal tube; a stop rod movable with said crosshead and extending substantially parallel to said piercing member; a stop movable from an inoperative position to engage said stop rod to limit movement of said piercing member beyond said predetermined position; means for forming a longitudinally extending slot in said tube; and means for opening and flattening said longitudinally slotted tube.

15. An apparatus for forming flattened metal strips including in combination, a container adapted to be charged with a heated metal blank; a die movable from a retracted position to an advanced position in operative association with said container; means for opening and flattening a longitudinally slotted metal tube, movable with said die; a blank piercing member movable in said container toward said die and having means thereon cooperable with said die for forming a longitudinally slotted tube; and a blank extruding ram movable in said container relative to said die subsequent to the movement of said blank piercing member.

16. An apparatus for forming flattened metal strips including in combination a container adapted to be charged with a heated metal blank; a die; a metal extruding ram having a longitudinally extending bore, movable toward said die; a blank piercing member movable in said bore toward said die; a nose on said blank piercing member having a tube splitting key thereon, adapted when in a predetermined position with respect to said die to form therewith an orifice for the extrusion therethrough of a longitudinally slotted metal tube; means for arresting movement of said blank piercing member in said predetermined position; and means associated with said die for opening and flattening said longitudinally slotted extruded tube.

17. An apparatus for forming flattened metal strips including in combination a container adapted to be charged with a heated metal blank; a die; a metal extruding ram having a longitudinally extending bore, movable toward said die; a blank piercing member movable in said bore toward said die; a nose on said blank piercing member having a pair of circumferentially spaced tube splitting keys thereon, adapted when in a predetermined position with respect to said die to form therewith an orifice for the extrusion therethrough of a divided metal tube; means for arresting movement of said blank piercing member in said predetermined position; a plow for opening and flattening said divided metal tube; and a guide tube interposed between said die and said plow for directing said divided metal tube to the plow.

18. The process of extruding unworked blanks into flattened metal strips including the steps of upsetting a heated blank in a container having a die in operative association therewith; forcing a piercing member having a nose portion of reduced diameter with a tube splitting key thereon, through the central portion of the blank to equalize the temperatures thereof; arresting the movement of the piercing member when the nose portion is in a predetermined position relative to the die and forms therewith an orifice for the extrusion therethrough of a longitudinally slotted metal tube; extruding the metal through the orifice to form a longitudinally slotted tube; and opening and flattening the slotted tube immediately following its extrusion through the die, all in the same continuous series of operations.

19. The process of extruding unworked blanks into flattened metal strips including the steps of placing an unworked heated metal blank in a container; upsetting the blank in said container, to shorten its length and increase its cross-sectional area; forcing a piercing member through the blank to equalize the inner and outer temperatures thereof and to elongate the blank; arresting the movement of the piercing member in a predetermined position relative to the die, to form therewith an orifice for the extrusion therethrough of a longitudinally slotted tube; extruding the metal through the orifice to form a longitudinally slotted tube; and opening and flattening the slotted tube immediately following its extrusion through the die, all in the same continuous series of operations.

20. The process of forming flattened metal strips from blanks by hot extrusion including the steps of upsetting a heated blank in the bore of a container having a die in operative association therewith, to decrease its length and increase its cross-sectional area to be substantially coextensive with that of said bore; forcing a piercing member, having a diameter at least one third of that of said upset blank, through the central portion of the blank to equalize the inner and outer temperatures thereof and to elongate the blank; arresting the movement of the piercing member in a predtermined position relative to the die, to form therewith an orifice for the extrusion therethrough of a longitudinally slotted tube; extruding the metal through the orifice to form a longitudinally slotted tube; and opening and flattening the slotted tube immediately following its extrusion through the die, all in the same continuous series of operations.

21. The process of forming flattened metal strips from blanks by hot extrusion including the steps of placing a heated metal blank adjacent an open end of a container; moving a die spaced from the container to push the blank into the container; locking the die in operative association with the container; forcing through the central portion of the blank a piercing tool having a nose of reduced diameter with a key thereon, to thereby equalize the temperatures in the blank; arresting the movement of the piercing member when the nose portion is in a predetermined position relative to the die and forms therewith an orifice for the extrusion therethrough of a longitudinally slotted metal tube; extruding the metal through the orifice to form a longitudinally slotted tube; and opening and flattening the slotted tube immediately following its extrusion through the die, all in the same continuous series of operations.

22. The process of forming flattened metal strips from blanks by hot extrusion including the steps of placing a heated metal blank adjacent an open end of a container; moving a die spaced from the container to push the blank into the container; locking the die in operative association with the container; forcing through the central portion of the blank a piercing tool, to thereby equalize the temperatures in the blank; arresting the movement of the piercing member when it is in a predetermined position relative to the die and forms therewith an orifice for the extrusion therethrough of a longitudinally slotted metal tube; extruding the metal through the orifice to form a longitudinally slotted tube; and opening and flattening the slotted tube immediately following its extrusion through the die, all in the same continuous series of operations.

23. An apparatus for forming flattened metal strips including in combination a container adapted to be charged with a heated metal blank; a die carrying head movable toward said container into an advanced position; a die secured to said head; a stationary member spaced from said container and extending transversely the longitudinal axis thereof; a wedging member movable to a position between said stationary member and said die carrying head to lock the latter in said advanced position; a blank piercing member movable in said container toward said die to form therewith an orifice for the extrusion therethrough of a tube; means for forming a longitudinally extending slot in said tube; a blank extruding ram movable in said container; and means for opening and flattening said longitudinally slotted tube after its extrusion from the die.

24. An apparatus for forming flattened metal strips including in combination, a container adapted to be charged with a heated metal blank; a die; a blank piercing member movable toward said die, adapted when in a predetermined position with respect to said die to form therewith a shape-forming orifice for the extrusion therethrough of a metal tube; a stop rod movable with said blank piercing member; a stop means movable from an inoperative position to engage said stop rod for limiting movement of said blank piercing member beyond said predetermined position; means for extruding the blank through said orifice subsequent to the movement of said piercing member; means for forming a longitudinally extending slot in said tube; and means for opening and flattening said longitudinally slotted tube.

25. The process of extruding unworked blanks into flattened metal strips including the steps of upsetting a heated blank in a container having a die in operative association therewith; forcing a piercing member through the central portion of the blank to substantially equalize the inner and outer temperatures thereof; extruding the metal through the die and forming a longitudinally slotted tube; and opening and flattening the slotted tube, all in the same continuous series of operations.

26. An apparatus for forming flattened metal strips including in combination, a container adapted to be charged with a heated metal blank; a die; a ram; a blank piercing member movable in said container toward said die to form therewith an annular opening for the extrusion therethrough of a metal tube; means for forcing said piercing member through said blank; means for subsequently compressing said blank between said ram and said die to extrude the metal through the orifice defined by said die and said piercing member; means for forming a longitudinally extending slot in said extruded tube; and means for opening and flattening said longitudinally slotted extruded tube.

27. An apparatus for forming flattened metal strips including in combination, a container adapted to be charged with a heated metal blank; a die; a ram; a member for piercing the central portion of the blank and for forming with said die when in a predetermined position relative thereto an annular opening for the extrusion therethrough of a metal tube; means for effecting relative movement of said piercing member and said die to cause said member to pierce said blank in the container; means for arresting relative movement of said piercing member and said die when in said predetermined relative position; means for subsequently compressing said blank between said ram and said die to extrude the metal through said annular opening; means for forming a longitudinally extending slot in said extruded tube; and means for opening and flattening said longitudinally slotted extruded tube.

28. The process of extruding unworked metal blanks into flattened metal strips including the steps of placing a heated metal blank in a container; forcing a piercing member through the central portion of the blank to substantially equalize the inner and outer temperatures thereof; extruding the metal through a die in operative association with the container and forming a longitudinally slotted tube; and opening and flattening the slotted tube, all in the same continuous series of operations.

STANLEY W. SPARKS.